United States Patent [19]

Nielsen

[11] Patent Number: 5,826,031
[45] Date of Patent: Oct. 20, 1998

[54] METHOD AND SYSTEM FOR PRIORITIZED DOWNLOADING OF EMBEDDED WEB OBJECTS

[75] Inventor: Jakob Nielsen, Atherton, Calif.

[73] Assignee: Sun Microsystems, Inc., Palo Alto, Calif.

[21] Appl. No.: 664,048

[22] Filed: Jun. 10, 1996

[51] Int. Cl.⁶ .................................................. G06F 13/38
[52] U.S. Cl. ............................ 395/200.63; 395/200.37; 395/200.49; 395/200.61
[58] Field of Search ................ 395/200.13, 200.63, 395/200.37, 200.49, 200.61; 370/616, 619, 621, 712, 118

[56] References Cited

U.S. PATENT DOCUMENTS

| | | | |
|---|---|---|---|
| 5,313,454 | 5/1994 | Bustini et al. | 370/13 |
| 5,347,632 | 9/1994 | Filepp et al. | 395/200 |
| 5,367,523 | 11/1994 | Chang et al. | 370/84 |
| 5,392,223 | 2/1995 | Caci | 364/514 |
| 5,537,408 | 7/1996 | Brandstad et al. | 370/79 |
| 5,574,724 | 11/1996 | Bales et al. | 370/68.1 |
| 5,583,857 | 12/1996 | Soumiya et al. | 370/233 |

*Primary Examiner*—Robert B. Harrell
*Assistant Examiner*—Saleh Najjar
*Attorney, Agent, or Firm*—Lowe, Price, LeBlanc & Becker

[57] ABSTRACT

In the preferred embodiment of the present invention, the method retrieves a web file and sorts one or more information element references according to a priority attribute associated with each reference. After ranking the information element references by priority, the method then retrieves each information element in the order that their references were ranked. After receiving an information element, a user acts upon the information element in the appropriate manner. Typical objects, and their actions, would include displaying an image file, executing an applet, or playing an audio file. By using the steps of the preferred method, more important objects are retrieved before less important objects, thus allowing the user to act upon the more important objects sooner than the user could have acted on the important objects using methods available in the prior art.

15 Claims, 7 Drawing Sheets

Figure 1

```
<html>
<head>
<title>

</title>
</head>
<!-- this is a comment -->
<body>

<address>

</address>
</body>
</html>
```

Figure 2

| <start tag> | <endtag> | function |
|---|---|---|
| <html> | </html> | HTML document indicator. |
| <head1> | </head> | Defines document head. |
| <title> | </title> | Document title information. Should be descriptive, used in indexing and search engines. |
| <body> | </body> | Document body |
| <h (n) >, <h1>... <h6> | </h (n) >, </h1>... </h6> | Headings. h1 is largest, h6 smallest |
| <! --- ---> |  | Comment. No ending tag required |

Figure 3

THOMAS JEFFERSON WAS ONE OF THE DRAFTERS OF
THE AMERICAN CONSTITUTION.

Figure 4

Url components

Figure 8

METHOD AND SYSTEM FOR PRIORITIZED DOWNLOADING OF EMBEDDED WEB OBJECTS

FIELD OF THE INVENTION

The present invention relates to an improved method and system for retrieving and acting on information elements in a computer network.

BACKGROUND OF THE INVENTION

Many users access the World Wide Web through low-bandwidth connections, resulting in slow receipt of web pages (i.e., "the response time problem"). Even though bandwidth is expected to grow in coming years, the file size of multimedia and virtual reality objects will most likely grow at least as fast as the increase in bandwidth. Therefore, from a user's perspective, the response time problem will not go away.

Current web browsers exacerbate the response time problem because they retrieve the objects on a web page in the sequence in which they are listed in a web file that defines the web page (e.g., an HTML file). Since the objects in most web files are not sequentially ordered within the file on the basis of their relative importance to the other objects in the file, current web browsers will not retrieve web objects in the order of their relative importance. For example, a web page often starts with a headerbar that is comparatively unimportant and should be downloaded last. Using today's browsers, however, the headerbar would instead be downloaded first.

Embodiments of the present invention offer a more flexible approach to ameliorating the response time problem by downloading web objects based on a priority attribute associated with each object reference in the web file.

SUMMARY OF THE INVENTION

Embodiments of the present invention provide an improved method and system for acting on information elements in a computer network. In a preferred embodiment, the information elements are web objects referenced in an HTML file. For example, a web object may be, but is not limited to, text, a graphical user interface element, an image file, an audio file, an applet, or other computer code. "Acting on" the information element typically includes, but is not limited to, displaying the text, displaying the graphical user interface element, displaying the image file, playing the audio file, executing the applet, or executing other computer code.

In the preferred embodiment of the invention, the method retrieves a web file and sorts one or more web object references according to a priority attribute associated with each web object reference. After ranking the web object references by priority, the method then retrieves each web object in the order that their references were ranked. After receiving a web object, a user acts upon the web object in the appropriate manner. By using the steps of the preferred method, more important objects are retrieved before less important objects, thus allowing the user to act upon the more important objects sooner than the user could have acted on the important objects using methods available in the prior art.

In another embodiment, the web object references are sorted using a two-step process. In the first step, the web object references are ordered into an initial list and are assigned a sequence number according to the sequence of their appearance in the file. The list is then reordered by descending priority level as a primary sort key and by ascending sequence number as a secondary sort key. In this way objects with a higher priority will be sorted to the top of the list and objects with the same priority will be sorted such that the objects referenced early in the web file are sorted above those objects referenced later in the file.

In yet another embodiment, the web objects are retrieved in parallel in order to decrease retrieval time. First, the method determines whether at least one web object is currently being retrieved. If an object is currently being retrieved then the following steps are preferably followed to facilitate parallel retrieval of another web object. The method obtains an indication of an available rate of incoming bandwidth to the client computer and also obtains an indication of an available rate of outgoing bandwidth to the server computer storing the web object. The method then determines a minimum rate of the available incoming bandwidth and the available outgoing bandwidth. The method then accepts data associated with the next information element at a rate corresponding to a selected increment over the minimum rate. In this way, the overall rate of retrieval is increased.

Notations and Nomenclature

The detailed descriptions which follow are presented largely in terms of methods and symbolic representations of operations on data bits within a computer. These method descriptions and representations are the means used by those skilled in the data processing arts to most effectively convey the substance of their work to others skilled in the art.

A method is here, and generally, conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be bourne in mind, however, that all of these and similar terms are to be associated with the appropriate physical quantities and are merely convenient labels applied to these quantities.

Useful machines for performing the operations of the present invention include general purpose digital computers or similar devices. The general purpose computer may be selectively activated or reconfigured by a computer program stored in the computer. A special purpose computer may also be used to perform the operations of the present invention. In short, use of the methods described and suggested herein is not limited to a particular computer configuration.

DETAILED DESCRIPTION

In the preferred embodiment of the present invention, the method retrieves a file and sorts one or more information element references according to a priority attribute associated with each reference. After ranking the information element references by priority, the method then retrieves each information element in the order that their references were ranked. After receiving an information element, a user acts upon the information element in the appropriate manner. Typical information elements, and their actions, would include displaying an image file, executing an applet, or playing an audio file. By using the steps of the preferred method, more important information elements are retrieved before less important information elements, thus allowing the user to act upon the more important information elements sooner than the user could have acted on the important information elements using methods available in the prior art.

For purposes of the preferred embodiment, the file will be referred to as a web file and the information elements will be referred to as objects or web objects. Those of ordinary skill will understand that the invention is not, however, limited to use with web files and web objects.

Figure 1:
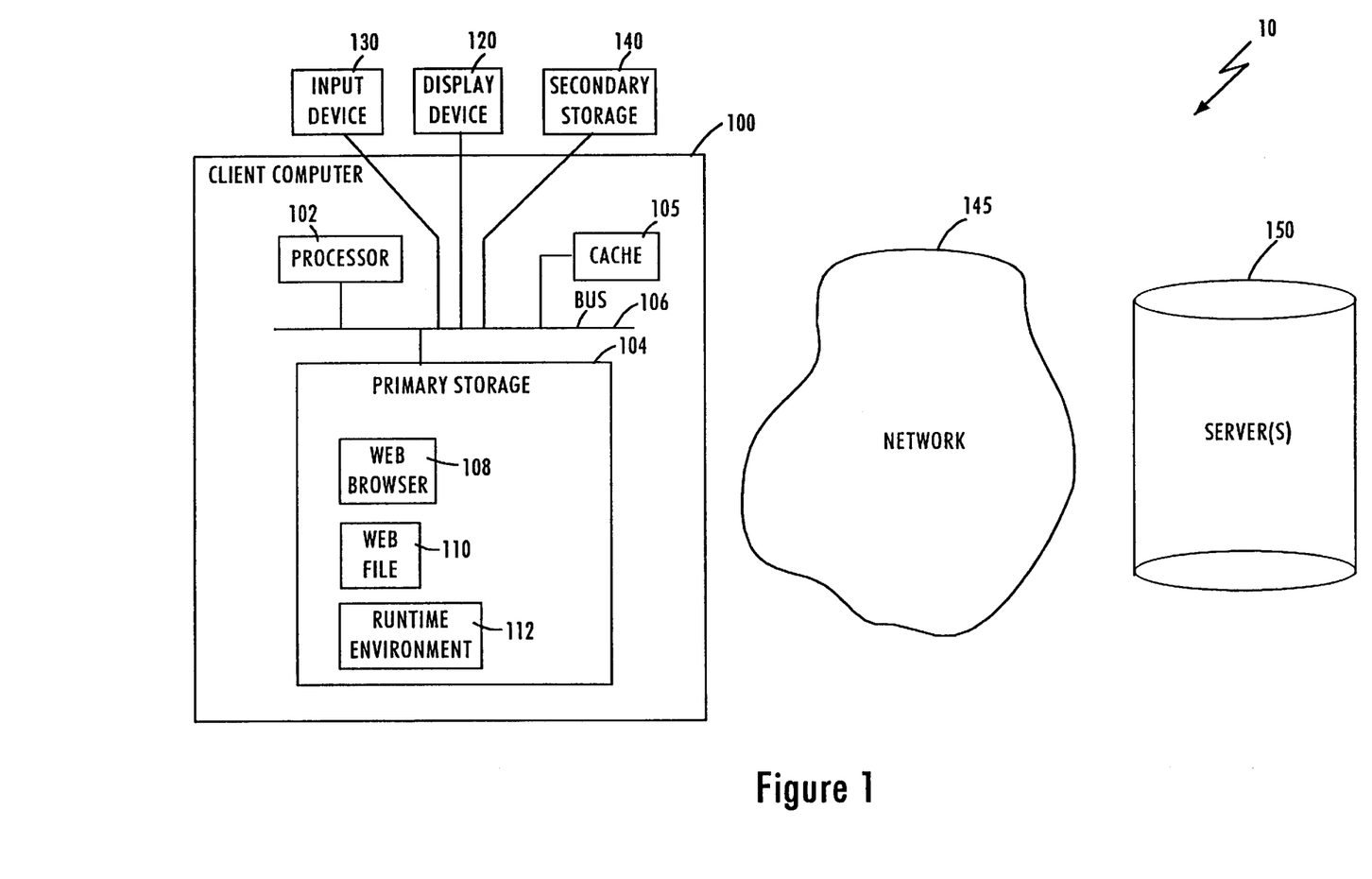
FIG. 1 is a block diagram of a computer network within which embodiments of the present invention can operate.

FIG. 1 is a block diagram of a computer network within which embodiments of the present invention can operate. Most computer networks in use today are generally of the structure shown in FIG. 1. Computer system 100 includes a processor 102 which fetches computer instructions from a primary storage 104 or a cache 105 through a bus 106 and executes those computer instruction. In executing computer instructions fetched from primary storage 104, processor 102 can retrieve data from or write data to primary storage 104, display information on one or more computer display devices 120, receive command signals from one or more user-input devices 130, or transfer data to other computer systems which collectively form a computer network (not shown). Processor 102 can be, for example, any of the SPARC processors available form Sun Microsystems, Inc. of Mountain View, Calif. or any processors compatible therewith. Primary storage 104 can include any type of computer primary storage including, without limitation, randomly accessible memory (RAM), read-only memory (ROM), and storage devices which include magnetic and optical storage media such as magnetic or optical disks. Computer display devices 120 can include, for example, printers and computer display screens such as cathode-ray tubes (CRTs), light-emitting diode (LED) displays, and liquid crystal displays (LCDs). User-input devices 130 can include without limitation electronic keyboards and pointing devices such as electronic mice, trackballs, lightpens, thumb-wheels, digitizing tablets, and touch sensitive pads.

Computer system 100 can be, e.g., any of the SPARCstation workstation computer systems available form Sun Microsystems, Inc. of Mountain View, Calif., any other Macintosh computer systems based on the PowerPC processor and available from Apple Computers, Inc. of Cuptertino, Calif., or any computer system compatible with the IBM PC computer systems available form International Business Machines, Corp of Somers, N.Y., which are based on the X86 series of processors available from Intel Corporation or compatible processors. Sun, Sun Microsystems, and the Sun Logo are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

Also executing within processor 102 from primary storage 104 is a runtime environment 112. Runtime environment 112 is generally a set of computer programs which enable computer system 100 to understand and process commands, control input and output of computer system 100 through user-input devices 130 and computer display devices 120, schedule computer processes for execution, manage data stored in various storage elements of primary storage 104 of computer system 100, and control the operation of peripheral devices (such as secondary storage 140) coupled to computer system 100. In some embodiments, runtime environment 112 may be an operating system or an operating system with a kernel. The preferred operating system is the Solaris operating system from Sun Microsystems, Inc., of Mountain View, Calif. [1] The kernel of an operating system is that portion of the operating system which manages the interface between computer processes (e.g., web browser 108) and user-input devices 130 and computer display devices 120, manages primary storage 104, schedules computer processes for execution, and maintains a file system which in turn manages storage of data (e.g., web file 110) on various storage elements of primary storage 104.

1. Sun and Solaris are trademarks or registered trademarks of Sun Microsystems, Inc., in the United States and other countries.

The preferred web file 110 is written in HTML, although any language which supports hypertext could be used. A brief discussion of HTML may lay the foundation for a clearer understanding of the teachings and suggestions of the present invention. The HTML markup language is analogous in some ways to the formatting codes used in word processing documents. A word processing document viewed through a word processing program is actually a combination of the text that you see and a series of hidden formatting codes (e.g., the carriage return, bold, and underline codes) which instruct the word processing program to display the word processing document in a specified way. Similarly, a hypertext document is actually a combination of the text that you see and a series of hidden "tags" or "anchors" (e.g., tags for new paragraphs, graphic images, hypertext links, etc.) which instruct the browser program to display the hypertext document in a specified way.

Figure 2:
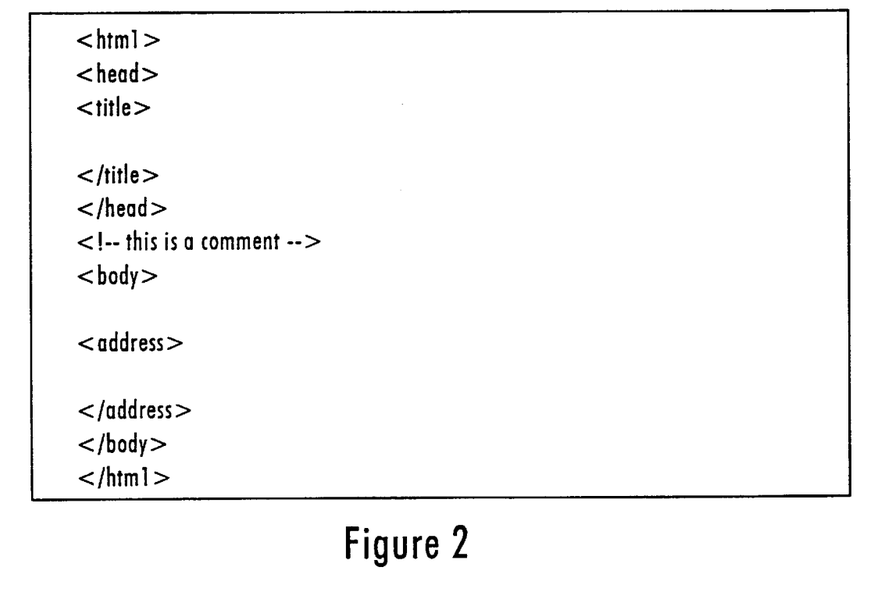
FIG. 2 is an example of a series of HTML document tags forming a template for a typical hypertext document.
Figure 3:
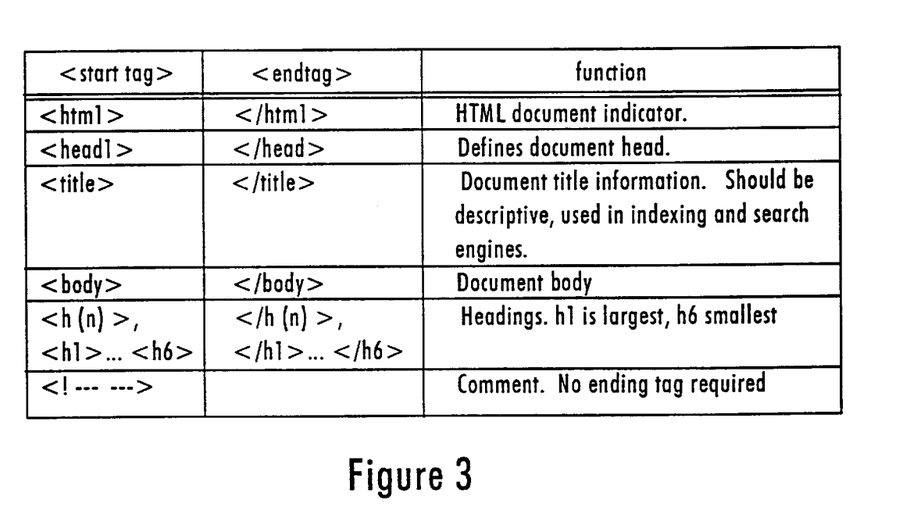
FIG. 3 summarizes, in a table, the HTML tags used to create the HTML template document.

A hypertext document is usually broken down into sections, with each section delineated by one or more HTML tags. HTML tags are formatting codes surrounded by the characters "<" and ">" (i.e., less than and greater than symbols). Some HTML tags have a start tag and an end tag. In general, end tags are in the format </"symbol"> where the "symbol" is the character string found between the characters <and > in the start tag. FIG. 2 is an example of a series of HTML document tags forming a template for a typical hypertext document. For example, the document of FIG. 2 is defined as an HTML document using the tags <html> and </html>. Then the "head" to the document, which typically includes a title, is defined using the tags <head>, </head>, <title>, and </title>, respectively. Following the head comes the "body" of the document which is often organized into subtopics with different levels of headings. The body is defined by the tags <body> and </body>. Headings are indicated by the tags <h#> and </h#>, where # is the level of the heading. Heading levels indicate the relative size of the heading. Heading level 1 is the largest heading size and heading level 6 is the smallest heading size. Finally, it is good practice to indicate the author of the document at the bottom of the document using the tags <address> and </address>. FIG. 3 summarizes, in a table, the HTML tags used to create the HTML template document.

Once the HTML template has been established, text is added to create a basic hypertext document. In order to improve readability, the author adds HTML character and paragraph formatting tags to the document. For example, the <p> tag instructs the browser to begin a new paragraph. If an author wants to highlight some text in bold, the author inserts the <b> tag at the beginning of the text to be highlighted and inserts a </b> tag at the end of the text to be highlighted. The tags <i> and </i> indicate text to display in italics.

Figure 4:
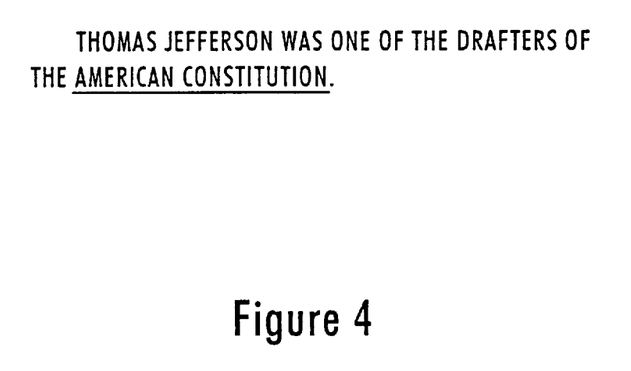
FIG. 4 illustrates a hypertext document on Thomas Jefferson with a hot link for "the American Constitution".

If HTML was merely made up of the document, paragraph, and character formatting tags discussed above, it would only allow an author to define a document which stands by itself. Fortunately, additional HTML tags allow an author to "link" documents together. If a reader of a hypertext document wants to know more about a topic before reading the rest of the current hypertext document, the reader selects a "link" or "hot link", which retrieves and displays a new document that provides related information. FIG. 4 illustrates a hypertext document (i.e., a "source document") on Thomas Jefferson with a hot link named "the American Constitution". The link could take the reader to a second hypertext document (i.e., a "destination document") which, for example, displays the text of the American Constitution or which provides more information on Thomas Jefferson's role in the drafting of the American Constitution.

In HTML, a hot link to a destination document is made by placing a "reference anchor" around the text to be highlighted (e.g., "the American Constitution") and then providing a network location where the destination document is located. Reference anchors extend the idea of start and end tags. A reference anchor is created when the start tag <a> and the end tag </a> are placed around the text to be highlighted (e.g., <a> the American Constitution </a>). Then attribute information that identifies the network location of the destination document is inserted within the <a> reference tag. In HTML, the "href=" attribute, followed by the network location for the destination document, is inserted within the <a> tag. For example, <a href="network location for the destination document"> the American Constitution </a> illustrates the basic format for a reference anchor. On the web, network locations of hypertext documents are provided using the Universal Resource Locator ("URL") naming scheme.

Figure 5:
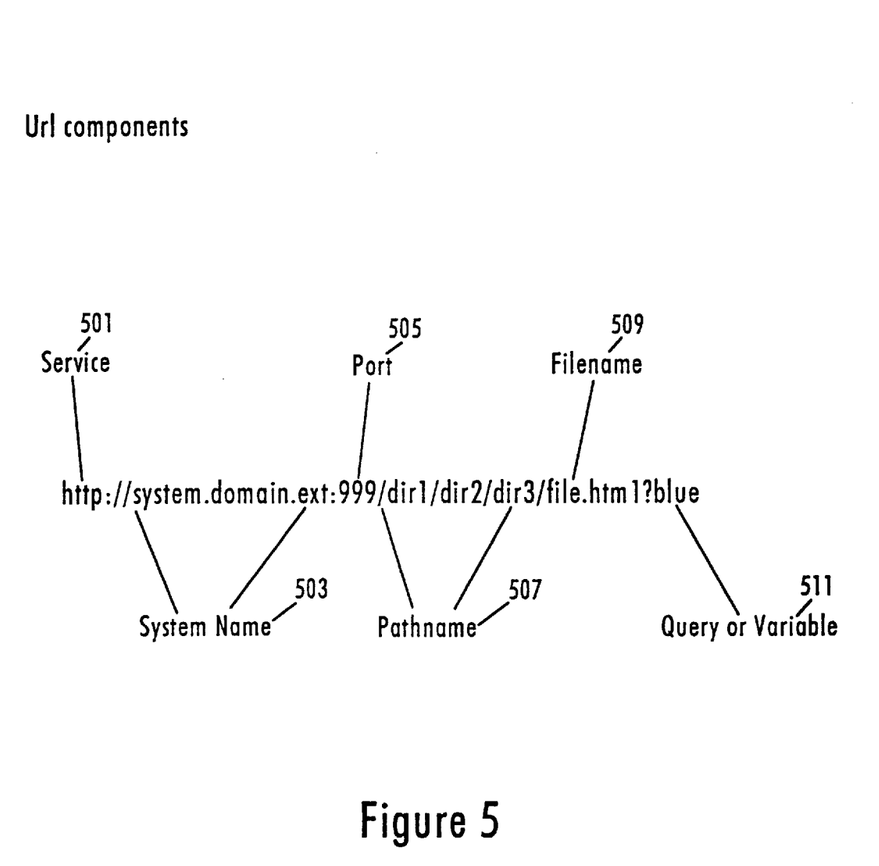
FIG. 5 illustrates the primary components of a Universal Resource Locator ("URL").

FIG. 5 illustrates the primary components of a URL. A service type 501 is a required part of a URL. The service type tells the user's browser how to contact the server for the requested data. The most common service type is the HyperText Transport Protocol or http. The web can handle several other services including gopher, wais, ftp, netnews, and telnet and can be extended to handle new service types. A system name 503 is also a required part of a URL. The system name is the fully qualified domain name of the server which stores the data being requested. A port 505 ia an optional part of a URL. Ports are the network socket addresses for specific protocols. By default, http connects at port 80. Ports are only needed when the server does not communicate on the default port for that service. A directory path 507 is a required part of a URL. Once connected to the system in question, a path to the file must be specified. A filename 509 is an optional part of a URL. The file name is the data file itself. The server can be configured so that if a filename isn't specified, a default file or directory listing is returned. A search component 511 is another optional part of a URL. If the URL is a request to search a data base, the query can be embedded in the URL. The search component is the text after the ? or # in a URL.

Substituting the URL "http:/system/dir/file.html" into the example above, the reference anchor:

<a href="http://system/dir/file.htrnl/"> the American Constitution </a> identifies an html file to retrieve and display when a user selects "the American Constitution" hot link.

As is described in more detail below, embodiments of the present invention extend the idea of anchors and tags by inserting a "PRIORITY" attribute into existing anchor and tag formats. For example, traditionally, an author specifies the downloading of an embedded object by including HTML markup of the following type in the HTML code specifying the page: <IMG SRC=mypicture.gif>. Using the present invention, the author assigns priority to the downloading of the embedded objects by adding a PRIORITY attribute to the tag for the object: <IMG SRC=mypicture.gif PRIORITY=5>.

The PRIORITY attribute should be set equal to a number (either negative, positive, or zero). If the value of a PRIORITY attribute is not a number then the browser 108 assumes that the priority of that embedded object is zero.

If a page using priority tags is displayed by a browser that has not yet been enhanced to work with the present invention, the PRIORITY attributes will simply be ignored, and the embedded objects will be downloaded following the standard rules used by that browser.

If a page is displayed by a browser that has been enhanced to work with embodiments of the present invention, the embedded objects will preferably be downloaded following the steps illustrated in FIGS. 6, 7, and 8, and described in detail below.

Continuing with the discussion of FIG. 1, computer network 10 also includes a network connection 145 for facilitating communication between host computer system 100 and server(s) 150. Network connection 145 can be any well know mechanism for facilitating communication between computers, such as, without limitation, a local area network, a wide area network, the Internet, or any of the well known wireless communication systems. Server(s) 150 typically store the information elements that are referenced in the web file 110 and are retrieved using the teachings and suggestions of the present invention.

Flow Diagrams Of The Preferred Embodiment

Figure 6:
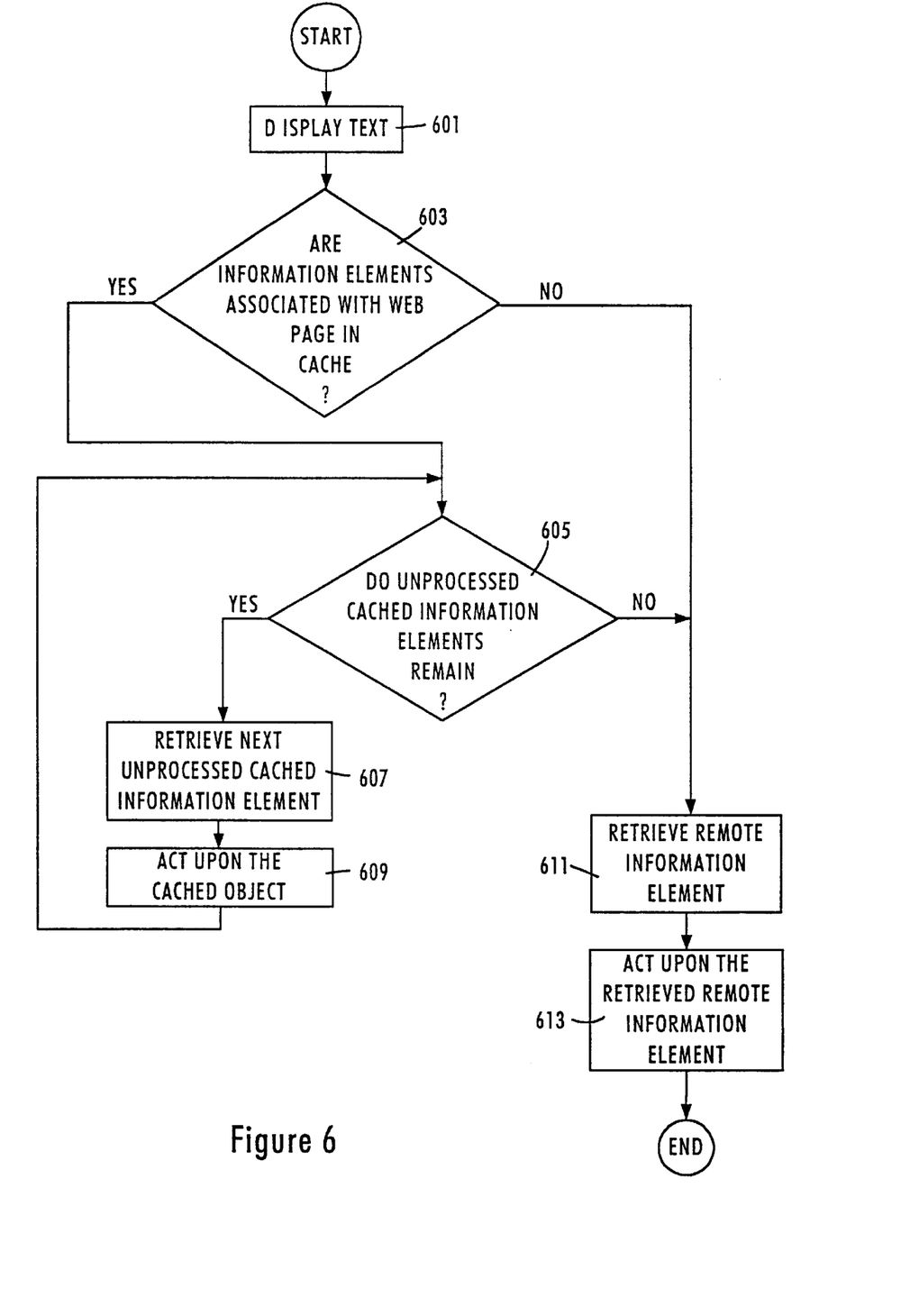
FIG. 6 is a flow diagram which illustrates the preferred steps for retrieving and acting on information elements referenced in a file.
Figure 7:
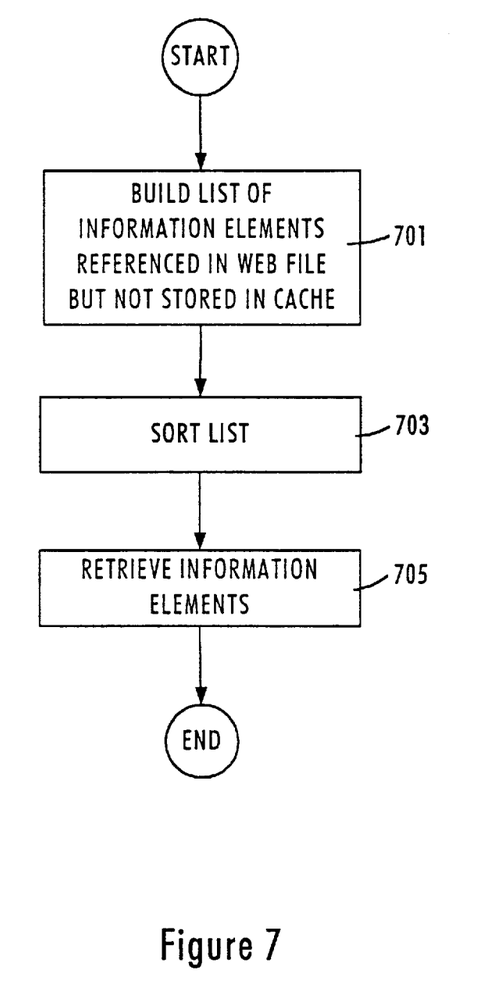
FIG. 7 is a flow diagram which illustrates the preferred steps for retrieving remotely stored web objects.

FIG. 6 is a flow diagram which illustrates the preferred steps for retrieving and acting on web objects referenced in a web file. In step 601, the browser reads the web file and displays the text on the screen following the well-established prior art methods for web-page display. This method involves leaving space on the page for embedded objects that need space (typically images and applets). If the object has WIDTH and HEIGHT attributes, then the amount of space reserved for the object is that specified by these attributes and otherwise, the space is initially set equal to the size of an icon (typically 32 by 32 pixels) and later adjusted to the actual size of the object when it has been downloaded (adjusting the space may involve moving subsequent parts of the page either up or down, depending on whether the initially reserved space was too large or too small).

In step 603, the browser determines if any web objects referenced by the web file are stored in its cache. If cached web objects exist then, in step 605, the browser determines if unprocessed cached web objects remain to be processed. If unprocessed web objects remain then, in step 607, the browser retrieves the next web object that is available in its cache. In step 609, the browser acts on the retrieved web object. Typically, "acting on an object" means displaying it if it is an image file, playing it if it is an audio file, and executing it if it is an applet or computer code, but the exact action to take is dependent on the media type of the object and follows prior art for currently known object types.

After all cached web objects have been retrieved, the browser invokes steps to retrieve web objects stored on a remote server (step 611). FIG. 7, which is described in more detail below, illustrates the preferred steps for retrieving remotely stored web objects. Upon receiving the remotely stored objects, the browser acts upon the retrieved web object (step 613).

As was mentioned above, FIG. 7 illustrates the preferred steps for retrieving remotely stored web objects. In step 701, the browser builds a list of all the embedded objects in the web file that were not found in the cache. The objects are preferably numbered by their sequential appearance in the web file (e.g., the first object is object 1, the second is object 2, etc.). If the object is referenced multiple times, it is preferably assigned the sequence number of its first reference in the file. Any object that does not have a PRIORITY attribute is preferably assigned a priority of zero.

In step 703, the browser preferably sorts the list by descending priority as the primary sort key and ascending sequence number as the secondary sort key. Thus, objects with a high priority will be sorted on top and objects with the same priority will be sorted such that the ones that are referenced early in the web file are sorted above those that are referenced later in the web file.

In step 705, the browser initiates retrieval of the objects from the remote server(s), preferably in the order in which they appear on the sorted list. Upon completion of step 705, processing ends in the method of FIG. 7 but continues with step 613 of FIG. 6 where the retrieved objects are acted upon (e.g., displayed, played, or executed).

Figure 8:
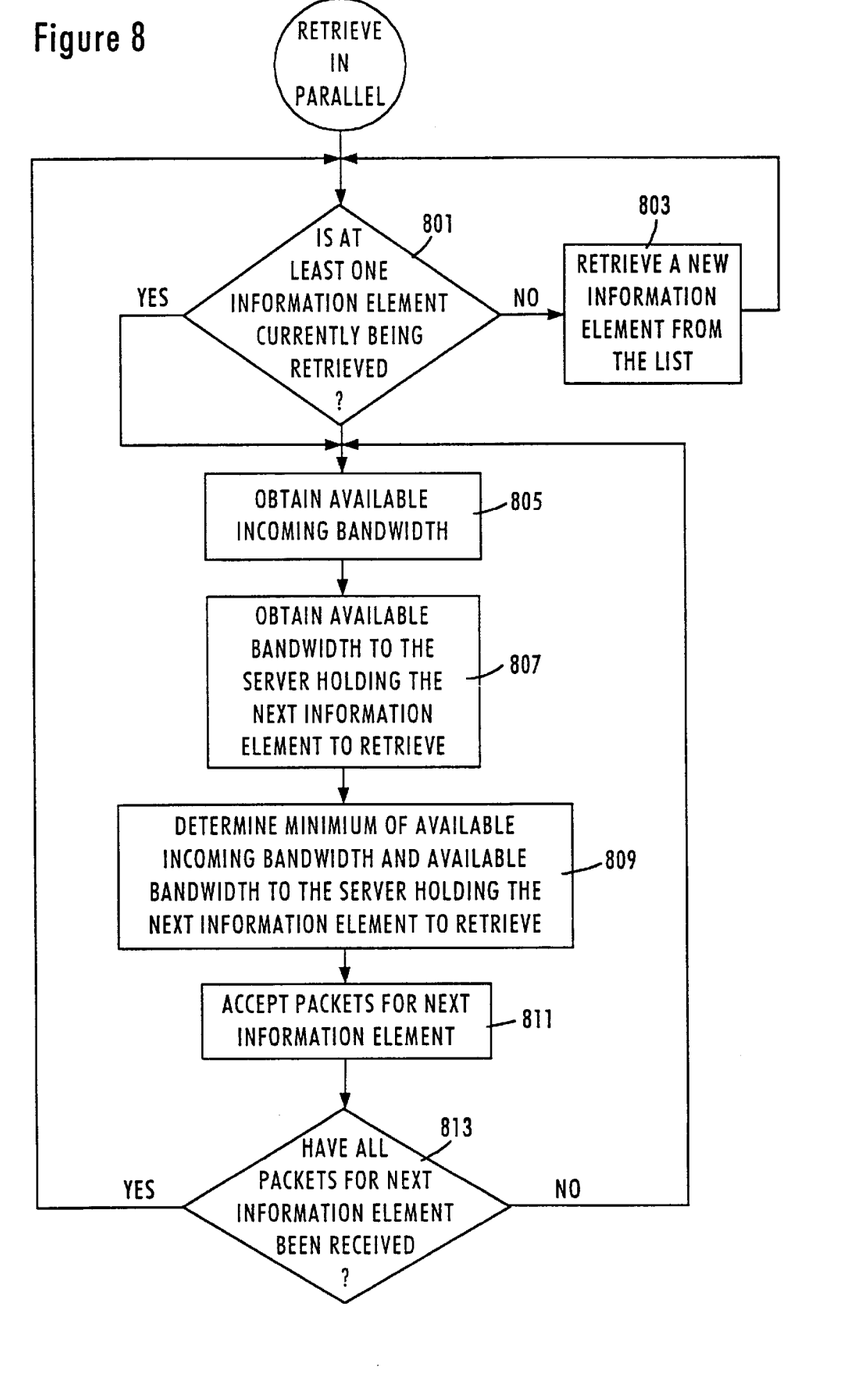
FIG. 8 illustrates the preferred steps for retrieving web objects in parallel.

FIG. 8 illustrates the preferred steps for retrieving web objects in parallel. The steps of FIG. 8 are performed as the preferred implementation of step 705 of FIG. 7. Once retrieval of an object has started, the browser preferably determines whether to start retrieval of the next object on the list by the following rules:

(i) if no objects are currently being retrieved (step 801), then start retrieving the next object (step 803).

(ii) if objects are currently being retrieved (step 801), but there is available incoming bandwidth AND available bandwidth to the server holding the object (steps 805 & 807), then start retrieving the next object, but only accept incoming packets for that object at 10% more than the minimum of the available incoming bandwidth and the available bandwidth to the server holding the object, recalculating this number once every second (steps 809 & 811) until all packets for the next object have been retrieved (step 813).

TABLE I

"available incoming bandwidth" is preferably defined as follows: total incoming bandwidth minus the sum of the number of bits received from higher ranked objects during the last second.
  "total incoming bandwidth" is preferably defined as follows: every ten seconds, the browser adds up the number of bits it has received from any source outside the computer on which it is running during those ten seconds. The browser stores the last one hundred of these measures that TABLE I-continued have been larger than zero, and total incoming bandwidth in bits per second is the largest of these one hundred measures divided by ten. When the user quits the browser, the current total incoming bandwidth number is stored in a preference file. When the user starts the browser, the previous total incoming bandwidth number is read from the preference file and used as the total incoming bandwidth for the current session until the first measure is available from the current session. The very first time the browser is started (or if the preference file cannot be found), the initial value for total incoming bandwidth is set equal to 28,800 bps.
  "available bandwidth to a server" is preferably defined as follows: total bandwidth to that server minus the sum of the number of bits received from higher ranked objects being retrieved from that server during the last second.
  "total bandwidth to a server" is preferably defined as follows: every two seconds, the browser adds up the number of bits it has received from that server during those two seconds. The browser stores the last twenty of these measures that have been larger than zero, and total incoming bandwidth in bits per second is the largest of these twenty measures divided by two. When the user quits the browser, the current total bandwidths to the servers are stored in a preference file with one entry for each server that has been contacted during the current session. The first time the browser accesses a server during a session, it reads the previous total bandwidth number for that server from the preference file and uses that number as the
total bandwidth to the server until the first measure is available from the current session. The very first time the browser accesses a server (or if the preference file cannot be found), the initial value for total bandwidth to the
server is set equal to 28,800 bps.

While specific embodiments have been described herein for purposes of illustration, various modifications may be made without departing from the spirit and scope of the invention. Accordingly, the invention is not limited to the above described embodiments. Instead the invention is defined by the appended claims in light of their full scope of equivalents.

What is claimed is:

1. A method executed in a computer network to facilitate acting on information elements, the computer network including at least a client computer and a server computer, the method comprising the steps of:

sorting a list of information elements so that the list is ranked from a first information element with a highest priority to a last information element with a lowest priority;

retrieving from the server computer to the client computer, the information elements in ranked order, and displaying retrieved information elements in the order received, wherein the step of retrieving the information elements further comprises the steps of:

determining whether at least one information element is currently being retrieved;

when the determination indicates that at least one information element is currently being retrieved, performing the following steps to facilitate retrieval of a next information element;

obtaining an indication of an available rate of incoming bandwidth to the client computer;

obtaining an indication of an available rate of outgoing bandwidth to the server computer;

determining a minimum rate of the available incoming bandwidth and the available outgoing bandwidth; and accepting data associated with the next information element at a rate corresponding to a selected increment over the minimum rate.

2. The method of claim 1 wherein the selected increment is 10%.

3. The method of claim 1 wherein the available incoming bandwidth is a total incoming bandwidth minus the sum of the number of bits received from higher ranked objects running during a last time period.

4. The method of claim 3 wherein the total incoming bandwidth is, within a given time period, defined by,
- determining a number of bits received from any source outside the computer system associated with the display device;
- comparing the determined number of bits with the quantity of bits received over periods of time other than the given period of time; and
- selecting the largest number of bits determined from the comparison as the total incoming bandwidth.

5. The method of claim 1 wherein the available bandwidth to the computer system storing the next information element is the total bandwidth to the computer system storing the next information element minus a sum of the number of bits received, during a given period, from retrieving an information element ranked higher than the next information element.

6. A computer program product to facilitate acting on information elements, in a computer network which includes a client computer and a server computer, the computer program product comprising:
- code that (1) sorts a list of information elements so that the list is ranked from a first information element with a highest priority to a last information element with a lowest priority; (2) retrieves from the server computer to the client computer, the information elements in ranked order, and (3) displays the information elements in the order retrieved,
- wherein the code resides on a tangible medium,
- wherein the step of retrieving the information elements further comprises:
  - code that determines whether at least one information element is currently being retrieved; and
  - code that performs the following steps to facilitate retrieval of a next information element, when the determination indicates that at least one information element is currently being retrieved,
  - code that obtains an indication of an available rate of incoming bandwidth to the client computer;
  - code that obtains an indication of an available rate of outgoing bandwidth to the server computer;
  - code that determines a minimum rate of the available incoming bandwidth and the available outgoing bandwidth; and
  - code that accepts data associated with the next information element at a rate corresponding to a selected increment over the minimum rate.

7. The computer program product of claim 6 wherein the selected increment is 10%.

8. The computer program product of claim 6 wherein the code that obtains the available incoming bandwidth includes code that determines a total incoming bandwidth minus the sum of the number of bits received from higher ranked objects being retrieved during a last time period.

9. The computer program product of claim 8 wherein the code that determines total incoming bandwidth, within a given time period, includes,
- code that determines a number of bits received from any source outside the computer system associated with the display device;
- code that compares the determined number of bits with the quantity of bits received over periods of time other than the given period of time; and
- code that selects the largest number of bits determined from the comparison as the total incoming bandwidth.

10. The computer program product of claim 6 wherein the code that obtains available bandwidth to the computer system storing the next information element includes code that determines the total bandwidth to the computer system storing the next information element minus a sum of the number of bits received, during a given period, from retrieving an information element ranked higher than the next information element.

11. An apparatus to facilitate acting on information elements in a computer network the computer network including a client computer and a server computer, the apparatus comprising:
- a mechanism configured to sort a list of information elements so that the list is ranked from a first information element with a highest priority to a last information element with a lowest priority; and
- a mechanism configured to retrieve from the server computer to the client computer, and to display the information elements, both in ranked order,
- wherein the mechanism configured to retrieve the information elements further comprises:
  - a mechanism configured to determine whether at least one information element is currently being retrieved;
  - a mechanism configured to perform the following steps to facilitate retrieval of a next information element, when the determination indicates that at least one information element is currently being retrieved,
  - a mechanism configured to obtain an indication of an available rate of incoming bandwidth to the client computer;
  - a mechanism configured to obtain an indication of an available rate of outgoing bandwidth to the server computer;
  - a mechanism configured to determine a minimum rate of the available incoming bandwidth and the available outgoing bandwidth; and
  - a mechanism configured to accept data associated with the next information element at a rate corresponding to a selected increment over the minimum rate.

12. The apparatus of claim 11 wherein the selected increment is 10%.

13. The apparatus of claim 11 wherein the available incoming bandwidth is a total incoming bandwidth minus the sum of the number of bits received from higher ranked objects running during a last time period.

14. The apparatus of claim 12 wherein the a mechanism configured to obtain the total incoming bandwidth is, within a given time period, includes,
- a mechanism configured to determine a number of bits received from any source outside the computer system associated with the display device;
- a mechanism configured to compare the determined number of bits with the quantity of bits received over periods of time other than the given period of time; and
- a mechanism configured to select the largest number of bits determined from the comparison as the total incoming bandwidth.

15. The apparatus of claim 11 wherein the mechanism configured to obtain the available bandwidth to the computer system storing the next information element includes a mechanism configured to determine the total bandwidth to the computer system storing the next information element minus a sum of the number of bits received, during a given period, from retrieving an information element ranked higher than the next information element.

* * * * *

UNITED STATES PATENT AND TRADEMARK OFFICE
CERTIFICATE OF CORRECTION

PATENT NO. : 5,826,031
DATED : October 20, 1998
INVENTOR(S) : Jakob NIELSEN

It is certified that error appears in the above-indentified patent and that said Letters Patent is hereby corrected as shown below:

Column 10, Line 46, after "wherein" delete "the"
Column 10, Line 47, after "bandwidth" delete " is"

Signed and Sealed this

Fourth Day of May, 1999

Attest:

Q. TODD DICKINSON

Attesting Officer     Acting Commissioner of Patents and Trademarks